United States Patent
Steinberg et al.

(10) Patent No.: US 11,068,702 B1
(45) Date of Patent: Jul. 20, 2021

(54) DEVICE, SYSTEM, AND METHOD FOR PERFORMANCE MONITORING AND FEEDBACK FOR FACIAL RECOGNITION SYSTEMS

(71) Applicant: MOTOROLA SOLUTIONS, INC., Chicago, IL (US)

(72) Inventors: Paul D. Steinberg, Wayne, IL (US); Peter L. Venetianer, Mclean, VA (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 0 days.

(21) Appl. No.: 16/942,150

(22) Filed: Jul. 29, 2020

(51) Int. Cl.
*G06K 9/00* (2006.01)

(52) U.S. Cl.
CPC ..... *G06K 9/00288* (2013.01); *G06K 9/00268* (2013.01); *G06K 9/00926* (2013.01)

(58) Field of Classification Search
CPC .......... G06K 9/00288; G06K 9/00268; G06K 9/00926
See application file for complete search history.

(56) References Cited

U.S. PATENT DOCUMENTS

| 10,303,866 | B1 * | 5/2019 | Van Os | G06K 9/00268 |
| 2009/0185746 | A1 * | 7/2009 | Mian | A01B 3/00 382/209 |
| 2011/0216947 | A1 * | 9/2011 | Hosoi | G06K 9/00288 382/116 |
| 2012/0011142 | A1 * | 1/2012 | Baheti | G06K 9/4671 707/769 |
| 2019/0095601 | A1 * | 3/2019 | Chan | G06F 21/316 |

FOREIGN PATENT DOCUMENTS

| CN | 102136024 A | 7/2011 |
| CN | 102799877 A | 11/2012 |

OTHER PUBLICATIONS

Fei Yang, Qian Zhang, Miaohui Wang and Guoping Qiu: "Quality Classified Image Analysis with Application to Face Detection and Recognition", arXiv:1801.06445v1 [cs.CV], Jan. 19, 2018, all pages.
Abhishek Dutta, Raymond Veldhuis, Luuk Spreeuwers: "Predicting Face Recognition Performance Using Image Quality", arXiv:1510.07119v1, [cs.CV], Oct. 24, 2015, all pages.

* cited by examiner

*Primary Examiner* — Md K Talukder
(74) *Attorney, Agent, or Firm* — Daniel R. Bestor

(57) ABSTRACT

Disclosed is a process for performance monitoring and feedback for facial recognition systems. A first image for image matching from a camera capture device at a first location is received for purposes of image matching. A highest match confidence score of the first image to a particular stored enrollment image is determined. One or more image or user characteristics associated with the first image or first user is identified. The identified image or user characteristics and highest match confidence score are added to a facial recognition monitoring and feedback model. Subsequently, a particular one of the stored image or user characteristics consistently associated with a below-threshold highest match confidence score is identified, and a notification is displayed or transmitted including an indication of an identified facial recognition low match pattern and identifying the particular one of the stored image characteristics or user characteristics.

20 Claims, 5 Drawing Sheets

DEVICE, SYSTEM, AND METHOD FOR PERFORMANCE MONITORING AND FEEDBACK FOR FACIAL RECOGNITION SYSTEMS

BACKGROUND OF THE INVENTION

Facial recognition systems are being deployed more frequently across private, commercial, and governmental installations as a means to authenticate persons, match persons against known persons of interest, and other use cases that take advantage of technology that continues to improve beyond human capabilities.

For example, at controlled-access points, passage barrier mechanisms may be maintained in a closed and locked state, and a user must positively authenticate via a facial recognition system (perhaps in combination with a card swipe or other dual factor mechanism) in order to access a controlled space.

As another example, governmental or private enterprise security agencies may leverage databases of known persons of interest in order to trigger notifications when a person of interest is either detected as being located more generally, or perhaps located in an area that they are not authorized to be in (perhaps absent any passage barrier mechanisms).

However, the accuracy (and thus usefulness and/or acceptance rate by users) of such facial recognition mechanisms may be heavily dependent upon the type of camera being used, the environment it is being used in, and/or the quality of installation of the camera, amongst other electronically measurable parameters. Errors or oversight in selection of types of cameras, environments, and/or installations may result in facial recognition systems that do not operate correctly, misidentify users, and/or become unintentionally biased against certain demographics and/or may result in varying quality of image captures across different installation locations.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
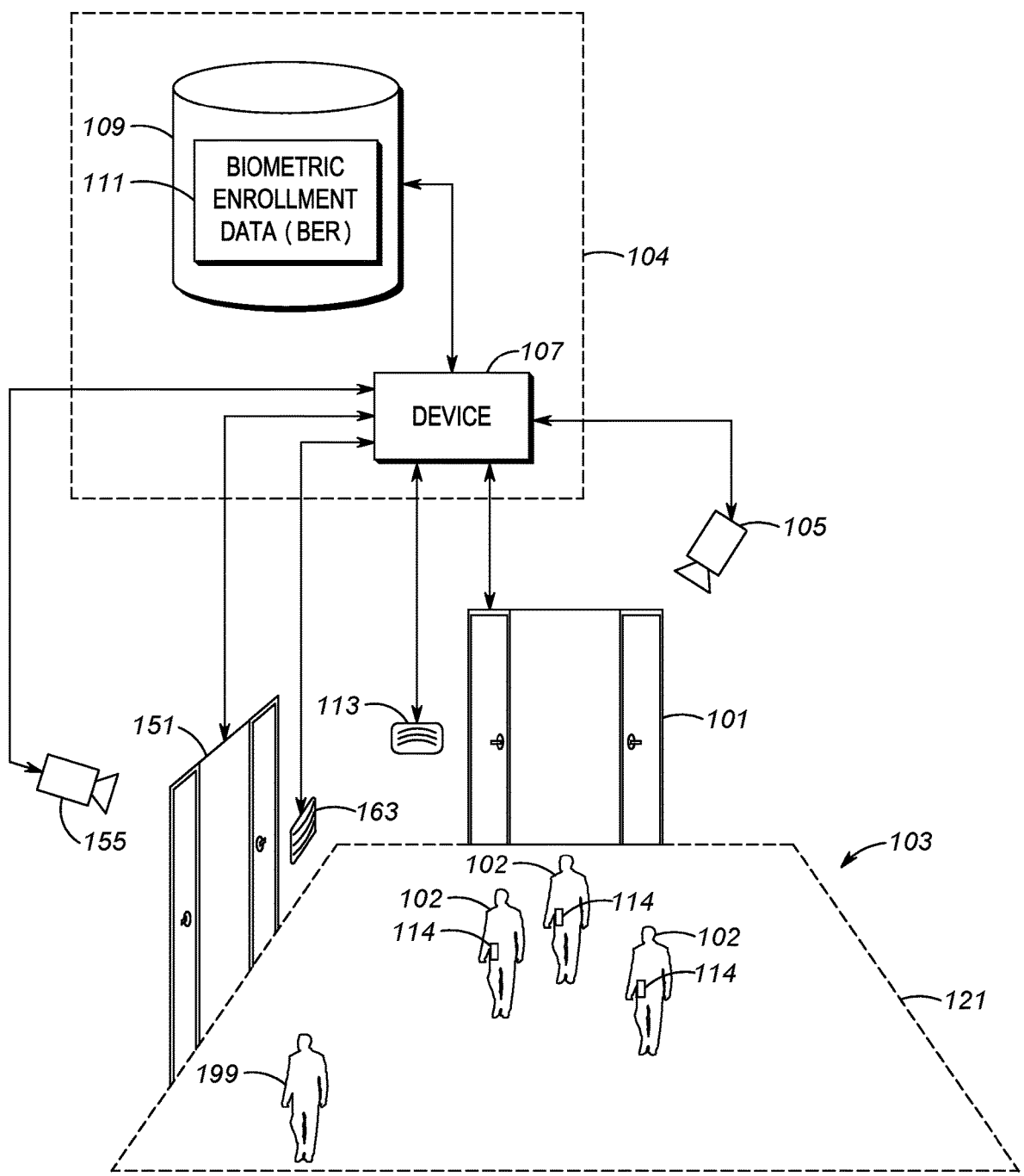
FIG. 1 is an example system for facial recognition performance monitoring and feedback in a passage barrier mechanism environment, in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

Given the breadth of facial recognition deployments and the number of parameters and/or characteristics of captured images themselves and of users within the captured images, it is impossible for administrators or owners of such systems to identify when such systems are not performing well due to errors in camera selection, errors in installation, and/or errors due to environmental conditions surrounding the cameras, that may have unequal impacts on users of different demographics and/or may result in unequal performance of facial recognition systems across different deployment locations.

What is needed is an improved facial recognition performance monitoring and feedback system that can electronically store representations of relevant performance characteristics across cameras, locations, and/or users, continuously or periodically evaluate the electronically stored performance characteristics, and proactively detect errors or oversights in selection of types of cameras, environments, and/or installations that may have resulted in facial recognition systems that are unintentionally biased against certain demographics and/or that may result in varying quality of image captures across different installation locations, and responsively access workflow mappings that may be leveraged to provide notifications and/or associated workflow solutions to correct the errors or oversights.

An aspect of the present specification provides a process for performance monitoring and feedback for facial recognition systems including: receiving, at a facial recognition computing device, a first image for image matching from a camera capture device at a first location for purposes of image matching to a gallery of images; determining, by the facial recognition computing device, a highest match confidence score of the first image to a particular one of a plurality of stored enrollment images in the gallery of images; determining, by the facial recognition computing device, one or more image characteristics or user characteristics associated with the respective first image or first user in the first image; adding, by the facial recognition computing device, the one or more image characteristics or user characteristics and associated highest match confidence score to an electronically stored facial recognition monitoring and feedback model; identifying, by the facial recognition computing device, and based on a plurality of stored image characteristics or user characteristics and associated highest match confidences in the facial recognition monitoring and feedback model, a particular one of the one or more stored image characteristics or user characteristics consistently associated with a below threshold highest match confidence score; and one of displaying a notification, by the facial recognition computing device at a display device communicably coupled to the facial recognition computing device and transmitting, by the facial recognition computing device, the notification to a supervisory computing system, the notification including an indication of an identified facial recognition low match pattern and identifying the particular one of the one or more stored image characteristics or user characteristics.

Another aspect of the present specification provides a facial recognition performance monitoring and feedback computing device includes: a controller in communication with a camera capture device, the controller configured to: receive a first image for image matching from a camera capture device at a first location for purposes of image matching to a gallery of images, the camera capture device communicatively coupled to the controller; determine a highest match confidence score of the first image to a particular one of a plurality of stored enrollment images in the gallery of images; determine one or more image characteristics or user characteristics associated with the respective first image or first user in the first image; add the one or more image characteristics or user characteristics and associated highest match confidence score to an electronically stored facial recognition monitoring and feedback model; identify, based on a plurality of stored image characteristics or user characteristics and associated highest match confidences in the facial recognition monitoring and feedback model, a particular one of the one or more stored image characteristics or user characteristics consistently associated with a below threshold highest match confidence score; and one of display a notification, at a display device communicably coupled to the facial recognition performance monitoring and feedback computing device and transmit, via a transceiver, the notification to a supervisory computing system, the notification including an indication of an identified facial recognition low match pattern and identifying the particular one of the one or more stored image characteristics or user characteristics.

Further advantages and features consistent with this disclosure will be set forth in the following detailed description, with reference to the figures. Each of the above-mentioned embodiments will be discussed in more detail below, starting with example system and device architectures of the system in which the embodiments may be practiced, followed by an illustration of processing blocks for achieving an improved technical method, device, and system for performance monitoring and feedback for facial recognition systems.

Attention first is directed to FIG. 1, which depicts an example system 100 for facial recognition performance monitoring and feedback with respect to a passage barrier mechanism. The various components of the system 100 are in communication via any suitable combination of wired and/or wireless communication links, and communication links between components of the system 100 are depicted in FIG. 1, and throughout the present specification, as double-ended arrows between respective components; the communication links may include any suitable combination of wireless and/or wired links and/or wireless and/or wired communication networks.

The system 100 comprises a first camera 105 and a first passage barrier mechanism 101 through which users 102, located in a controlled area 103, may pass when authorized, for example into a first secure space beyond the first passage barrier mechanism 101.

The system 100 further comprises a second camera 155 and a second passage barrier mechanism 151 through which users 102 may similarly pass when authorized, for example into a second secure space different from the first secure space.

The system 100 further comprises a biometric imaging backend system 104 that, as depicted, comprises a computing device 107 and a database 109 (and/or a memory in communication with the computing device 107) storing biometric enrollment data 111 (labelled "BER" in FIG. 1) used to authenticate the users 102 based on images and/or biometric data, and the like, acquired via the cameras 105 and/or 155 or some other camera.

For example, the biometric enrollment data 111 may store biometric signatures and/or biometric data (e.g. one or more values that represent biometric data), and the like, of the users 102 extracted from previously acquired images of the users 102 (which may include, but is not limited to, still image captures and video, in the visible spectrum, infrared spectrum, or some combination thereof, among other possibilities).

While present examples are described with reference to facial recognition being used by the biometric imaging system 104 for authentication, other use cases could leverage the facial recognition monitoring and feedback system and methods described herein, including but not limited to governmental or private enterprise security agencies leveraging databases of known persons of interest (e.g., known criminals, known persons with outstanding warrants, known persons with psychological disorders, known ex-employees no longer allowed on a corporate campus, etc.) in order to trigger notifications when a person of interest is captured via a camera imaging device, such as a fixed camera deployed at a public or private location, a first responder or enterprise vehicular camera, a first responder or enterprise body camera, or some other location or use case, and matched to previously enrolled images of the persons of interest.

The cameras 105, 155 are facing towards the controlled area 103, and acquire images and/or biometric data from the controlled area 103, as described below. The images and/or biometric data used to authenticate the users 102 may be a first authentication factor of the system 100 used (alone, or in combination with other factors) to authorize the users 102 to enter through the respective passage barrier mechanism 101, 151.

In some examples, the passage barrier mechanisms 101, 151 may comprise a door, a double door, a gate, a portal, an entrance, a turnstile, an exit, and the like through which passage is electronically controlled. The passage barrier mechanisms 101, 151 may be located at an entrance and/or an exit to a building, and the like, through which passage is electronically controlled. While the passage barrier mechanisms 101, 151 are depicted as a physical barrier mechanism, the passage barrier mechanisms 101, 151 may additionally and/or alternatively comprise any suitable non-physical barrier mechanism through which passage is controlled.

As depicted, the system 100 may further comprise authentication systems 113, 163 such as a card reader (as depicted), and the like, for example located adjacent the passage barrier mechanisms 101, 151 that may optionally be used as an additional factor to authenticate users 102 for passage through the passage barrier mechanisms 101, 151. As depicted the authentication systems 113, 163 are also in communication with the computing device 107 (which may comprise an on-premises server or cloud computing device), however in other examples, the system 100 may comprise another computing device of the authentication system 113, 163 used to authorize users using an authentication factor associated with the authentication systems 113, 163. As depicted, the users 102 may carry cards 114, such as near field communication (NFC) cards, and/or access cards, and the like, that store data associated with a respective user 102 (e.g. such as an identification number), which may also be stored at the biometric enrollment data 111 and/or in association with the biometric enrollment data 111 and/or in a different database and/or memory (e.g. in communication with the device 107 and/or another computing device, for example in association with the respective user 102). A given user 102 may place a respective card 114 adjacent the authentication system 113, 163 and the computing device 107 may read the data on the respective card 114 and compare data read from the respective card 114 with data stored in association with the biometric enrollment data 111 (and/or the given user 102), to authenticate the given user 102. The data of the cards 114 used to authenticate the users 102 may be a second authentication factor of the system 100, which may be used, for example in addition to biometric authentication, to authorize a user 102 to enter through the passage barrier mechanism 101, 151 or may be further used for facial recognition monitoring and feedback as further discussed below.

While not depicted, the users 102 may also carry mobile devices which may store tokens for authentication and may be configured to interact with the authentication system 113, 163 (e.g. such mobile devices may include an NFC system, Bluetooth™ system, and the like) to authenticate the users 102 using such tokens.

Furthermore, while two authentication systems per barrier entry 101, 151 are depicted in the system 100, the system 100 may alternatively include only the biometric imaging system 104 and corresponding cameras 105, 155, or may include more than two authentication systems including, the biometric imaging system 104 and one more additional authentication system which may include the authentication system 113, 163 and/or another authentication system, including, but not limited to, a password entry system, a fingerprint reader system, a voice authentication system, an iris reader system, and the like.

Returning to the biometric imaging system 104 and the controlled area 103, each of the cameras 105, 155 associated with the biometric imaging system 104 may have different characteristics (e.g., they may be different models of camera or manufactured by different manufacturers, and have different capture resolutions, image sensor sizes, light sensitivities, focal lengths, noise floors, shutter types, dynamic range, bit depths, and/or other parameters that may affect the quality of an image capture and may differ from one model or manufacturer to another), may have different ages since manufactured or since installed, may have different fields of view (e.g., be subject to different environmental conditions such as natural or artificial light, perhaps based on time of day or day of week or year, background light or foreground light, reflections, burnt out bulb or bulb replaced with a higher than expected lumen output, etc.), and/or may have different installation characteristics (e.g., horizontal or vertical angle of installation, height of installation, etc.). Such characteristics of each camera 105, 155 may be electronically determined, or may be configured and stored electronically (automatically or manually entered) as associated with each camera 105, 155 upon installation at the camera 105, 155 itself and/or at the device 107, among other possibilities.

The biometric enrollment data 111 stores images and/or biometric data (e.g. facial landmarks, infrared images and/or data, and the like) that are commensurate with the images and/or biometric data acquired by the cameras 105, 155, or other enrolment cameras, and the like.

For example, the biometric enrollment data 111 may be generated and stored at the database 109 in a one-to-one basis with the users 102, using a camera such as the camera 105 or camera 155, and/or a similar biometric imaging device (e.g. when the users 102 register with the biometric imaging system 104 or when images of persons of interest are enrolled into the system by, for example, a first responder, doctor or psychiatrist, human resources representative, building owner, bondsman, bank/creditor, or other custodian having access to add enrollment images to the biometric enrollment data 111 database) such that the biometric enrollment data 111 may store respective images and/or biometric data of the users 102.

In addition to the enrollment images themselves, the biometric enrollment data 111 may store demographic information associated with each user (and/or associated with each enrollment image). For example, an enrollment image for a particular user 102 stored in biometric enrollment data 111 (or, in some embodiments, associated with a user identification number from an access card associated with the authentication system 113, 163, which itself may then be associated with an enrollment image) may include stored user characteristics associated with the particular user 102 in the enrollment image, including one or more of a unique identity (e.g., name, government identifier number, enterprise identifier number, a height, a hair color, a gender (male, female, other), an age (absolute or age range, such as 0-10, 11-20, etc., or age type, such as child, teenager, adult, senior, etc.), a skin tone (e.g., black, white, brown), and/or an ethnicity (e.g., African-American, Latinx, Caucasian, Asian, etc.), among other potentially electronically visually perceptible characteristics.

Thereafter, images and/or biometric data of a user 102, acquired by the camera 105 or 155 (or acquired by some other actor, such as an officer via bodycam or vehicle camera, or by a fixed camera located in a public or private space), and the like, may be compared, by the computing device 107, against the respective images and/or biometric data of the user 102 stored in the biometric enrollment data 111 to find a match and, in particular with the example set forth in FIG. 1, authorize the user 102 to pass through the passage barrier mechanism 101 or 151, among other use cases already set forth herein.

Figure 2:
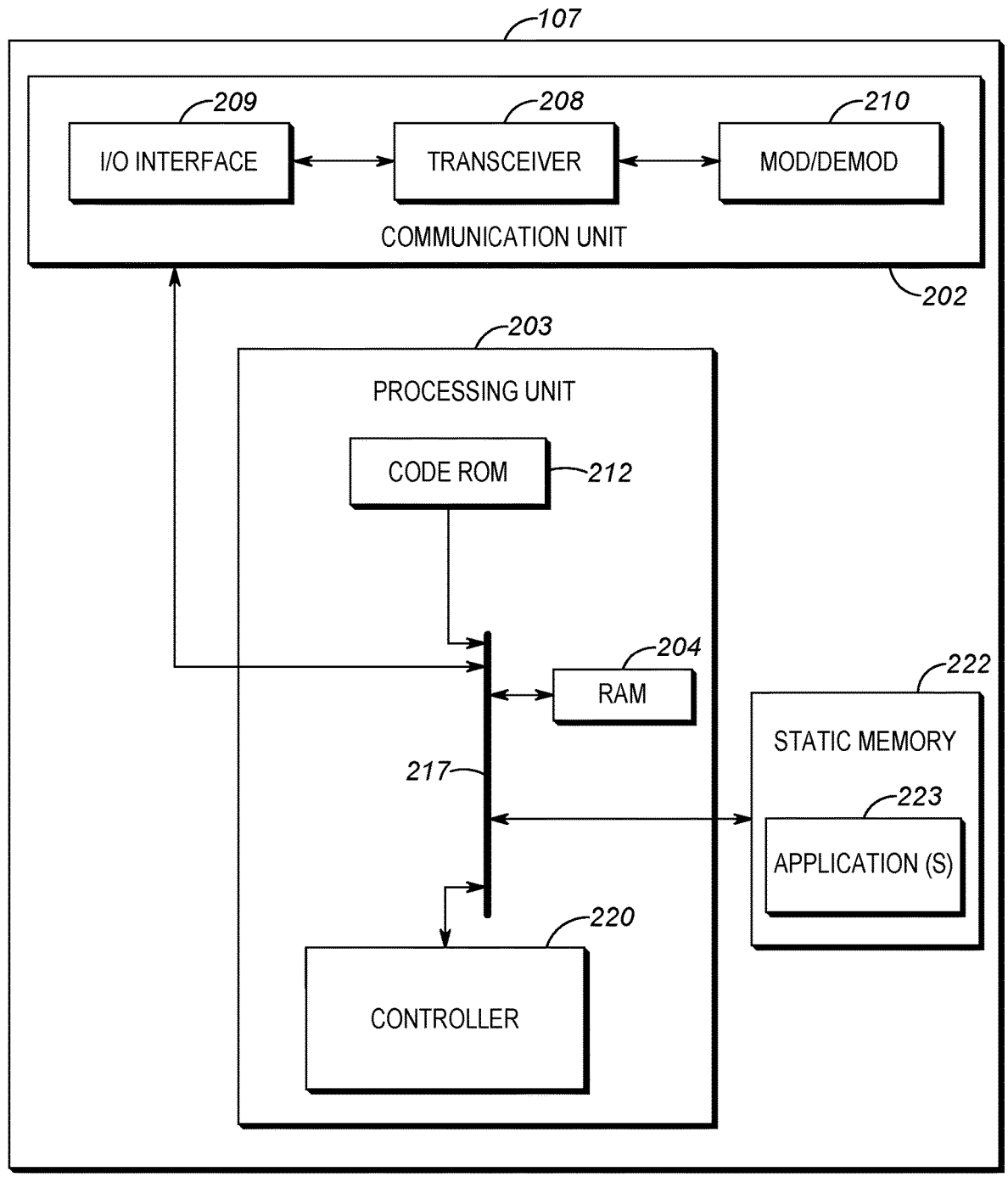
FIG. 2 is a device diagram showing a device structure of a device for facial recognition performance monitoring and feedback, in accordance with some embodiments.

Attention is next directed to FIG. 2 that depicts a schematic block diagram of an example of the computing device 107, interchangeably referred to hereafter as the device 107. In general, the device 107 may comprise one or more servers and/or one or more cloud computing devices, or some combination of the foregoing and the like, configured to communicate with the cameras 105, 155, the database 109, and optionally the authentication systems 113, 163. While in the particular example of FIG. 1 describing a biometric access system the device 107 may also communicate with barrier entry systems 101, 151, while in other embodiments, the device 107 may instead communicate with private or government officer computing devices (which may include bodycams, mobile smart phones, or desktop computers, among others) operated by private or government officers and via which images of potential suspects or potential persons of interest may be provided for matching by the device 107.

The device 107 may additionally or alternatively comprise a computing device such as a personal computer and/or a laptop computer, and the like. In some examples, the device 107 may be combined with the cameras 105, 155 and/or any other suitable device of the system 100. The device 107 may be located local or remote from the passage barrier mechanisms 101, 151 or the private or government officer computing devices mentioned earlier, and/or from the other components of the system 100 described above.

As depicted, the device 107 comprises: a communication unit 202, a processing unit 203, a Random-Access Memory (RAM) 204, one or more wireless transceivers 208 (which may be optional), one or more wired and/or wireless input/output (I/O) interfaces 209, a combined modulator/demodulator 210, a code Read Only Memory (ROM) 212, a common data and address bus 217, a controller 220, and a static memory 222 storing at least one application(s) 223. Hereafter, the at least one application 223 will be interchangeably referred to as the application 223.

While not depicted, the device 107 may include one or more of an input device and a display screen and the like such that a user, such as a system administrator, and the like, may interact with and/or configure the device 107.

As shown in FIG. 2, the device 107 includes the communication unit 202 communicatively coupled to the common data and address bus 217 of the processing unit 203.

The processing unit 203 may include the code Read Only Memory (ROM) 212 coupled to the common data and address bus 217 for storing data for initializing system components. The processing unit 203 may further include the controller 220 coupled, by the common data and address bus 217, to the Random-Access Memory 204 and the static memory 222.

The communication unit 202 may include one or more wired and/or wireless input/output (I/O) interfaces 209 that are configurable to communicate with other components of the system 100 and/or the biometric imaging system 104. For example, the communication unit 202 may include one or more transceivers 208 and/or wireless transceivers for communicating with other components of the system 100 and/or the biometric imaging system 104, among other computing devices including the private or government officer computing devices mentioned earlier. Hence, the one or more transceivers 208 may be adapted for communication with one or more communication links and/or communication networks used to communicate with other components or computing devices. For example, the one or more transceivers 208 may be adapted for communication with one or more of the Internet, a Bluetooth network, a Wi-Fi network, for example operating in accordance with an IEEE 802.11 standard (e.g., 802.11a, 802.11b, 802.11g, 802.11ax), a 3G standard network (including Global System for Mobiles (GSM) and Code Division Multiple Access (CDMA) standards), an LTE (Long-Term Evolution) network and/or other types of GSM networks, a 5G (including a network architecture compliant with, for example, the 3GPP TS 23 specification series and a new radio (NR) air interface compliant with the 3GPP TS 38 specification series) standard network, a Citizens Broadband Radio Service (CBRS), Worldwide Interoperability for Microwave Access (WiMAX) network, for example operating in accordance with an IEEE 802.16 standard, and/or another similar type of wireless network. Hence, the one or more transceivers 208 may include, but are not limited to, a cell phone transceiver, a Bluetooth transceiver, a CBRS transceiver, a Wi-Fi transceiver, a WiMAX transceiver, and/or another similar type of wireless transceiver configurable to communicate via a wireless radio network.

The communication unit 202 may optionally include one or more wireline transceivers 208, such as an Ethernet transceiver, a USB (Universal Serial Bus) transceiver, or similar transceiver configurable to communicate via a twisted pair wire, a coaxial cable, a fiber-optic link, or a similar physical connection to a wireline network. The transceiver 208 is also coupled to a combined modulator/demodulator 210.

The controller 220 may include ports (e.g. hardware ports) for coupling to other hardware components of the system 100 and/or the biometric imaging system 104, among other possibilities.

The controller 220 includes one or more logic circuits, one or more processors, one or more microprocessors, one or more ASIC (application-specific integrated circuits) and one or more FPGA (field-programmable gate arrays), and/or another electronic device. In some examples, the controller 220 and/or the device 107 is not a generic controller and/or a generic device, but a device specifically configured to implement functionality for performance monitoring and feedback for facial recognition systems. For example, in some examples, the device 107 and/or the controller 220 specifically comprises a computer executable engine configured to implement functionality for performance monitoring and feedback for facial recognition systems.

The static memory 222 is a non-transitory machine readable medium that stores machine readable instructions to implement one or more programs or applications. Example machine readable media include a non-volatile storage unit (e.g. Erasable Electronic Programmable Read Only Memory ("EEPROM"), Flash Memory) and/or a volatile storage unit (e.g. random-access memory ("RAM")). In the example of FIG. 2, programming instructions (e.g., machine readable instructions) that implement the functional teachings of the device 107 as described herein are maintained, persistently, at the memory 222 and used by the controller 220, which makes appropriate utilization of volatile storage during the execution of such programming instructions.

Figure 3:
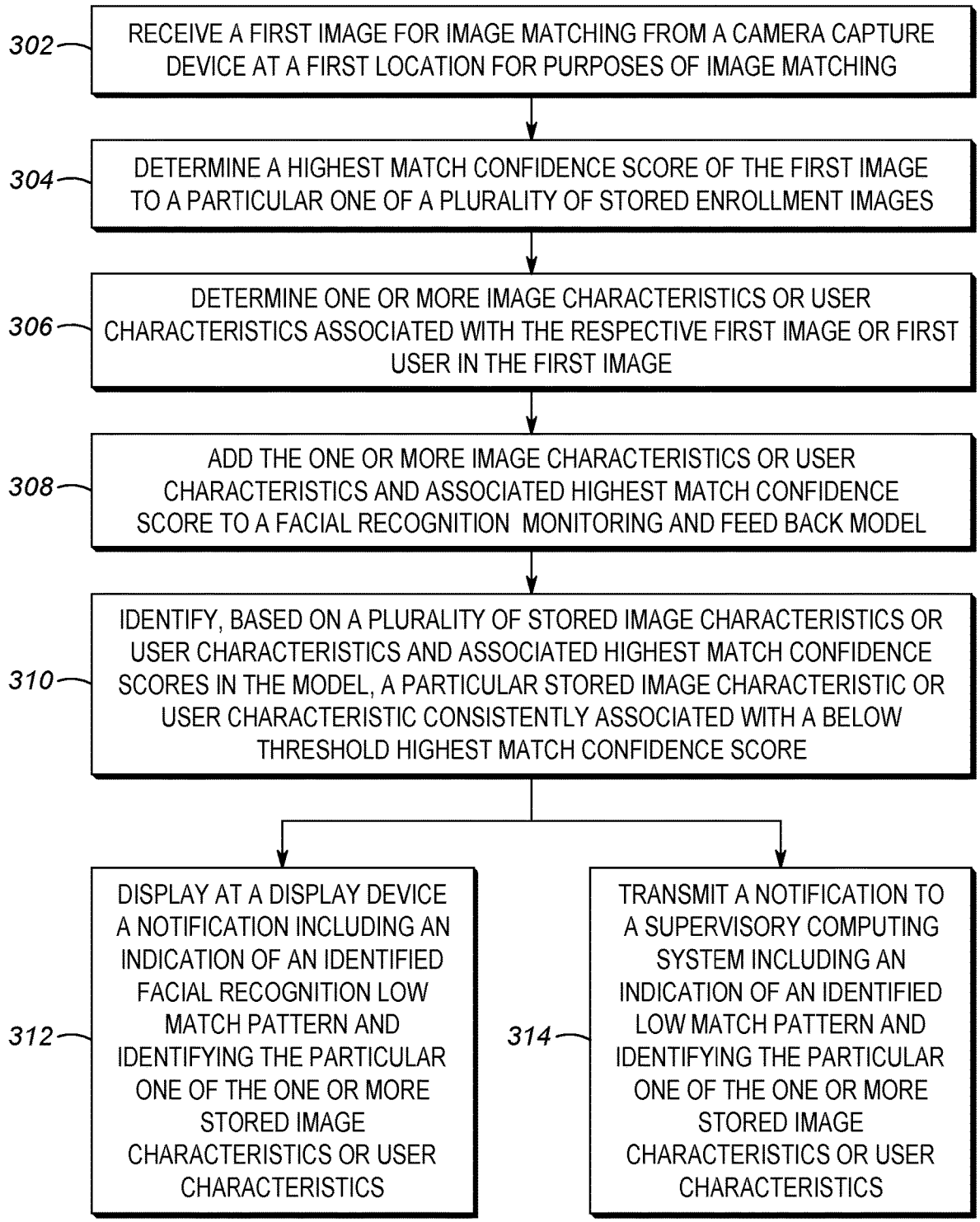
FIG. 3 is a flowchart of a method for facial recognition performance monitoring and feedback, in accordance with some embodiments.
Figure 6:
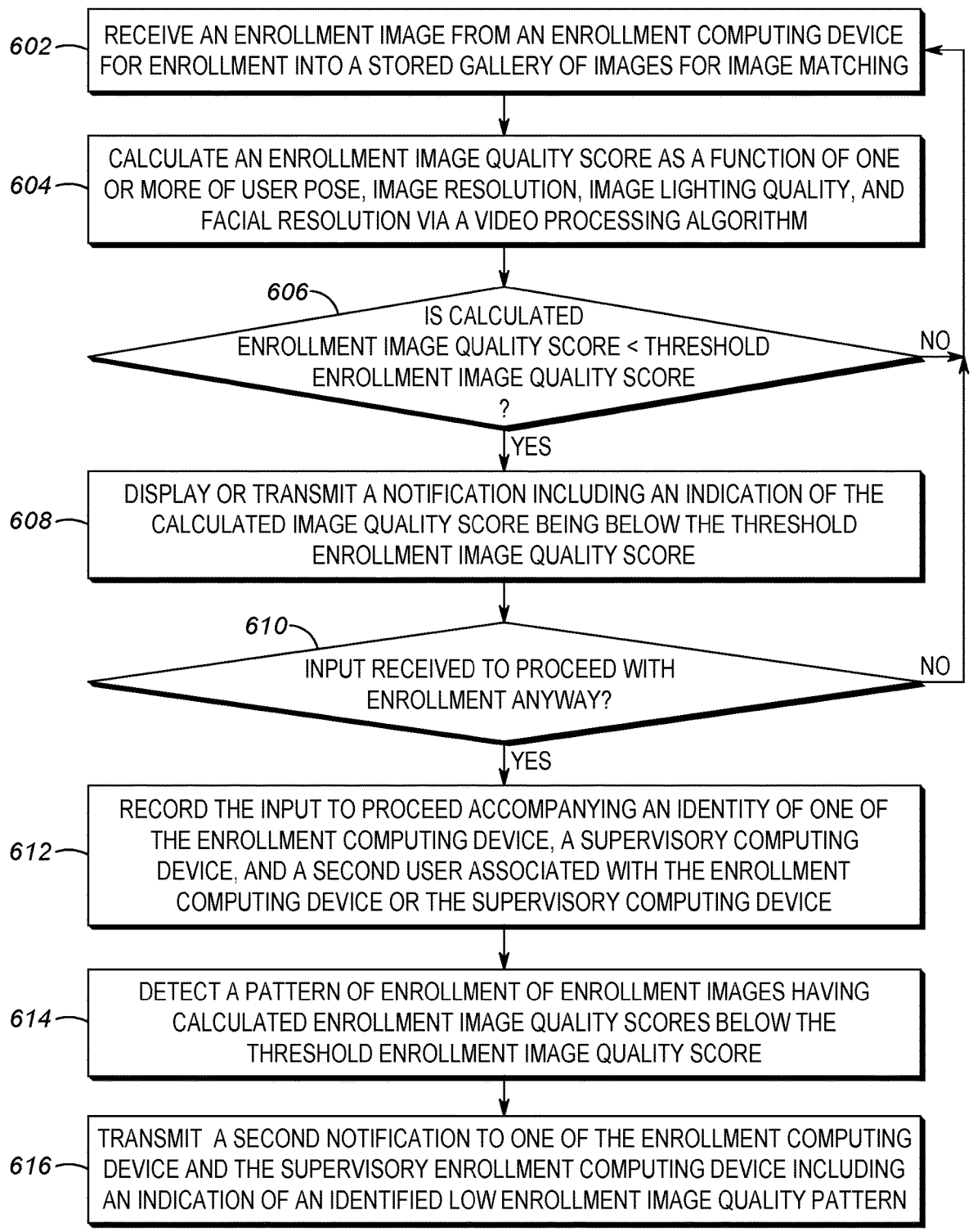
FIG. 6 is a flowchart of a method for facial recognition enrollment image monitoring and feedback, in accordance with some embodiments.

In illustrated examples, when the controller 220 executes the one or more applications 223, the controller 220 is enabled to perform one or more of the aspects of the present invention set forth earlier in the present specification, including but not limited to the blocks set forth in FIGS. 3 and 6. The application 223 may include programmatic algorithms, and the like, to monitor facial recognition algorithms and provide feedback consistent with the forthcoming disclosure, or in the alternative, may include machine learning and/or deep-learning based algorithms and/or neural networks, and the like, which have been trained to monitor facial recognition algorithms and provide feedback in a same or similar manner to the programmatic algorithms.

The one or more machine learning algorithms and/or deep learning algorithms and/or neural networks of the application 223 may include, but are not limited to: a generalized linear regression algorithm; a random forest algorithm; a support vector machine algorithm; a gradient boosting regression algorithm; a decision tree algorithm; a generalized additive model; evolutionary programming algorithms; Bayesian inference algorithms, reinforcement learning algorithms, and the like. However, generalized linear regression algorithms, random forest algorithms, support vector machine algorithms, gradient boosting regression algorithms, decision tree algorithms, generalized additive models, and the like may be preferred over neural network algorithms, deep learning algorithms, evolutionary programming algorithms, and the like, in some public-safety and/or security environments. However, any suitable machine learning algorithm and/or deep learning algorithm and/or neural network is within the scope of present examples.

Attention is now directed to FIG. 3 that depicts a flowchart representative of a method 300 for facial recognition monitoring and feedback consistent with this disclosure. The operations of the method 300 of FIG. 3 correspond to machine readable instructions that are executed by the device 107, and specifically the controller 220 of the device 107. In the illustrated example, the instructions represented by the blocks of FIG. 3 are stored at the memory 222 for example, as the application 223. The method 300 of FIG. 3 is one way in which the controller 220 and/or the device 107 and/or the system 100 may be configured. Furthermore, the following discussion of the method 300 of FIG. 3 will lead to a further understanding of the system 100, and its various components.

The method 300 of FIG. 3 need not be performed in the exact sequence as shown and likewise various blocks may be performed in parallel rather than in sequence. Accordingly, the elements of method 300 are referred to herein as "blocks" rather than "steps." The method 300 of FIG. 3 may be implemented on variations of the system 100 of FIG. 1, as well, as discussed alternatively herein.

At a block 302, the controller 220 and/or the device 107 receives a first image from a camera capture device at a first location for purposes of image matching. As set forth earlier, the camera capture device may be a fixed or mobile capture device, and may be provided for any number of use cases, including but not limited to, biometric access to a controlled space, matching against a database of known persons of interest, or other one of several other possible use cases.

Referencing the particular example of a biometric access control illustrated in FIG. 1, the camera capture device may be any one of cameras 105 or 155, and the first image may be provided for purposes of access to a secured area such as one beyond first or second passage barrier mechanisms 101, 151 via a biometric access system when the first image matches a particular one of a plurality of stored enrollment images in the gallery of images representing authorized individuals with a minimum threshold match confidence. Other use cases consistent with this disclosure are possible as well.

The first image received at block 302 may include additional image metadata embedded in the image itself, stored adjacent the first image (e.g., in a header or footer portion of an image file), or in a separate metadata file received separately from but referencing or associated with or otherwise linked to the received first image. The metadata accompanying the first image may include information uniquely identifying the camera capture device that captured the first image (e.g., such as a unique serial number, IP address, or MAC address), a location at which the camera capture device was disposed when the first image was taken (e.g., a GPS location, a manually assigned building location such as "main lobby entrance #1", or some other unique location identifier), a time and/or date at which the first image was captured, and/or camera parameters that set forth physical and/or electronic characteristics of the camera capture device that took the first image (e.g., such as aperture, focal length, sensor size, capture resolution, shutter type, noise floor, dynamic range, bit depth, manufacturer, model, installation height, vertical and/or horizontal angle and zoom (e.g., if a pan-tilt-zoom (PTZ) capable camera), and/or other parameters). The received first image, and any associated image metadata, may be temporarily or permanently stored at the controller 220 and/or the device 107 or at some other remote or cloud-storage communicably accessible to the controller 220 and/or the device 107.

At a block 304, the controller 220 and/or the device 107 determines a highest match confidence score of the first image to a particular one of a plurality of stored enrollment images in the gallery of images. The plurality of stored enrollment images may be accessible locally at the controller 220 and/or the device 107, or may be stored and accessible at some other on-premises server or cloud-based storage, among other possibilities. The plurality of stored enrollment images may include enrollment images generated consistent with the process set forth in FIG. 6 below, or may be generated via some other image enrollment process. Each enrollment image in the stored gallery of images may include one or more images of a particular user (for purposes of biometric access control), person of interest (for purposes of matching private or public persons of interest, such as known criminals or ex-employees), or other relevant person for other possible use cases. In some embodiments, a set of images may be associated with a single user or person of interest, and may be varied from one another based on pose, lighting, resolution, or other factors in order to provide increased chances of finding higher confidence matches. Other possibilities exist as well.

Additionally, each enrollment image in the gallery of stored images may similarly include associated enrollment image metadata, again, embedded in the image itself, attached to the image as in a header or footer, or stored separately from the image but linked to the image by filename, link, hash, or some other mechanism. The enrollment image metadata stored with each enrollment image may include image characteristics of the image (e.g., resolution, timestamp of a time the enrollment image was taken, a location stamp of a location at which the enrollment image was taken, any one or more of the camera parameters already set forth above of a camera that was used to take the enrollment image, or other image characteristics) and/or may include user characteristics of the user in the enrollment image that may be one of automatically determined via an image processing analytic applied to the enrollment image or manually entered during the enrollment process (e.g., one or more of a unique identity (such as "John Smith" or JS1234), height, hair color, gender (male, female, other), age (absolute or age range, such as 0-10, 11-20, etc., age type as described earlier, or other age-based designation), skin tone (e.g., black, white, brown), and/or ethnicity (e.g., African-American, Latinx, Caucasian, Asian, etc.), among other potentially electronically visually perceptible user characteristics).

Various image processing algorithms may be used to match the first image against enrollment images in the gallery of images, including but not limited to geometric hashing, edge detection, scale-invariant feature transform (SIFT), speeded-up robust features (SURF), binary robust independent elementary features (BRIEF), neural networks, deep learning, genetic, gradient-based and derivative-based matching approaches, template matching, or image segmentation and blob analysis. Other possibilities exist as well.

An output of the image matching algorithm used may identify a particular one of the plurality of enrollment images in the gallery of images that most closely matches the first image, and may provide a confidence level (e.g., 0 to 100% confidence of a match or some other numeric measure different from a percentage) or a matching level (e.g., 0 to 100% match or some other numeric measure different from a percentage) associated with the particular one of the plurality of enrollment images as the highest match confidence score.

In some embodiments, more than one image matching algorithm may be applied, and the responsive confidence or match level returned as the highest match confidence score may be an average, mean, maximum, or minimum match level of the first image to the particular one of the plurality of enrollment images, among other possibilities.

In some embodiments, if the confidence or match level returned as the highest match confidence score is below a threshold level, such as 25%, 50%, or 75%, a response of "no match" may be provided and process 300 may end without performing any subsequent blocks, while in other embodiments, a response of "no match" may be provided to a requesting user or computing system for the purposes of the use case (e.g., biometric access or identification of a person of interest) but subsequent blocks of process 300 may still be performed for monitoring a performance of a facial recognition system and providing feedback consistent with this disclosure. In other embodiments, a separate 'monitoring process' threshold different from the 'matching' threshold above may be applied in determining whether to continue process 300, and may be lower than the 'matching' threshold, such as 20% or 40%, among other possibilities.

In some embodiments where there is a "no match" response provided by the returned confidence or match level (and the process 300 may normally end), but a second authentication factor such as a card swipe matches a user identifier in enrollment image metadata of an existing enrollment image in the gallery of images, the process 300 may be caused to continue using the enrollment image matching the card swipe so that the highest match confidence score (and associated user and/or image characteristics) in this instance are still added to the facial recognition monitoring feedback model.

At a block 306, the controller 220 and/or the device 107 determines one or more image characteristics or user characteristics associated with the respective first image or first user in the first image. The one or more image characteristics or user characteristics may include any one or more, or any combination thereof, of the image characteristics and user characteristics as described earlier.

In some embodiments, the image characteristics may be extracted from image metadata accompanying the first image and received at the controller 220 and/or the device 107 from the camera capture device described at step 302. In other embodiments, the image characteristics may be determined as a function of the first image or image metadata received, for example, a camera identifier uniquely identifying the camera capture device may be cross-referenced by the controller 220 and/or the device 107 to determine a location of the camera capture device (e.g., where the camera capture device is a fixed camera a location mapping database may be accessed to determine a location of the camera capture device and which may be used as an image characteristics in process 300). Other possibilities for identifying image characteristics exist as well.

User characteristics may be determined at step 306 in a number of ways, including but not limited to via image processing performed by controller 220 and/or the device 107, by accessing image metadata associated with a matching enrollment image having the highest match confidence score against the first image from block 304, and/or by accessing user metadata associated with a secondary authentication factor such as a card swipe via authentication systems 113, 163 of FIG. 1 (e.g., such as a substantially simultaneous card swipe of a security card, such as within 1, 5, or 10s) occurring substantially simultaneously with capture of the first image captured by the camera capture device and cross-referenced with user metadata associated with a unique identifier of the security card, among other possibilities.

As just one example, a first image of a user 102 captured by a camera 105 of the biometric authentication system of FIG. 1 may have a highest match confidence score against a particular enrollment image in the gallery of images, and one or more of the following image and user characteristics may be retrieved and associated with the first image:

TABLE I

Example Image and User Characteristics Metadata

| | |
|---|---|
| Image Characteristics of First Image: | Camera ID: 0xAFD32560 |
| | Camera Mfr: Motorola |
| | Camera Model: H4A |
| | Location: IL156 Lobby #1 |
| | Install Height: 7 feet |
| | Install Angle: 30° H, 40° V |
| | Focal Length: 18 mm |
| | Shutter Type: Electronic |
| | Dynamic Range: 10 |
| | Measured Light Level: 5,000 Lux |
| | Time Stamp: 11:00 AM CST |
| | Date Stamp: Jan. 1, 2020 |
| User Characteristics of First Image: | Name: John Smith |
| | Face Pose in First Image: 30° |
| | Face Pose in Enrollment Image: 0° |
| | Gender: Male |
| | Age: 20-30 |
| | Height: 5'10" |
| | Hair Color: Black |
| | Skin Color: Brown |
| | Ethnicity: Indian |
| | User Image Enrolled By: John Jacobs |

As illustrated in Table I above, image characteristics received in image metadata accompanying or embedded within the first image, or cross-referenced via local or remote mappings using information from the image metadata accompanying or embedded within the first image, including cross-referenced information from the highest matching enrollment image from the gallery of images, may include one or more of a unique user name (such as "John Smith", perhaps stored as associated with a matching enrollment image or with a security access card swiped substantially simultaneously with the capture of the first image), a camera ID uniquely identifying the camera capture device from block 302 as "0xAFD32560", a camera manufacturer ID identifying a manufacturer of the camera capture device from block 302 as "Motorola", a camera model ID identifying a model of the camera capture device from block 302 as "H4A", a location ID identifying a location of the camera capture device from block 302 as "IL156 Lobby #1," an installation height value identifying an installation height of the camera capture device from block 302 as "7 feet", an installation angle (or current PTZ angle upon capture) of 30° H, 40° V, a focal length of the camera capture device from block 302 as "18 mm", a shutter type of the camera capture device from block 302 as "Electronic," a dynamic range of the camera capture device from block 302 as "10" (stops), a measured light level upon capture of the first image by the camera capture device from block 302 as "5,000" (Lux), a time stamp of the image capture of "11:00 AM CST", and a date stamp of the image capture of "Jan. 1, 2020."

As further illustrated in Table I above, user characteristics of a user in the first image identified via image processing of the first image executed at the camera capture device from block 302, at the controller 220 and/or the device 107 or some other computing device communicably connected to the controller 220 and/or the device 107, or via cross-reference to stored user metadata associated with or embedded in the particular stored enrollment image having the highest match confidence score from block 304, may include one or more of a calculated face pose of the user in the first image of "30°" (e.g., measured from a full frontal profile position at 0°), a calculated face pose of the user in the particular enrollment image of "0°" (e.g., a full frontal profile), a gender of "Male", an age range of "20-30" years, a height of "5' 10'"" equivalent to five feet and ten inches, a hair color of "black," a skin color of "brown," an ethnicity of "Indian", and an image enrolled by identifier of "John Jacobs" (e.g., the person that enrolled the enrollment image for that user).

In various embodiments at block 306, only user characteristics may be determined, only image characteristics may be determined, or any combination of one or more of the foregoing may be determined, based on electronic configuration. While Table I illustrates the user and image characteristics in a table-like format, in other embodiments, other database formats, including relational databases, could be used in addition or instead. Furthermore, while various user and/or image characteristics are illustrated in Table I for exemplary purposes only, certain ones (or more) may be eliminated for use in monitoring and/or providing feedback, and/or may be made optional depending on local, state, county, and/or federal law.

At a block 308, the controller 220 and/or the device 107 adds the one or more image characteristics or user characteristics and highest match confidence score to a facial recognition monitoring and feedback model. For example, the facial recognition monitoring and feedback model may be a database of image and/or user characteristics and associated highest match confidence scores. Using the example set forth above with respect to Table I, the image and user characteristics associated with the first image may be stored in the facial recognition monitoring and feedback model accompanying the highest match confidence score from block 304, which may be, as one example, a calculated value of 75%. The highest match confidence score may be stored in the facial recognition monitoring and feedback model accompanying the set of image and/or user characteristics, may be separately stored with each separate image characteristic and/or user characteristic of the first image, or may be stored in any other way of linking image and/or user characteristics with highest match confidence scores that can then be correlated to find patterns (e.g., consistent associations) in latter steps of process 300 between image and/or user characteristics and unusually or threshold low highest match confidence scores for particular image and/or user characteristics in the manner set forth in more detail below.

In some embodiments, the facial recognition monitoring and feedback model may be populated with image and/or user characteristics and associated highest match confidence scores for a single camera for detecting threshold low highest match confidence scores for particular image or user characteristics at that particular single camera. In other embodiments, the facial recognition monitoring and feedback model may be populated with image and user characteristics and associated highest match confidence scores across a plurality of cameras across a plurality of geographic installations having various environmental parameters and/or other characteristics for detecting threshold low highest match confidence scores for particular image or user characteristics across those plurality of cameras and/or geographic installations.

At a block 310, the controller 220 and/or the device 107 identifies, based on a plurality of stored image characteristics or user characteristics and associated highest match confidences in the facial recognition monitoring and feedback model, a particular one of the one or more stored image characteristics or user characteristics consistently associated (e.g., a pattern of two or more) with a below threshold highest match confidence score. While specific examples of algorithms and mechanisms for identifying user and/or image characteristic outliers are set forth below, other algorithms and mechanisms for identifying outlier characteristics (user and/or image) could be used as well without departing from the spirit and scope of this description.

The pattern identification in block 310 may be performed after every time another first image is received at the controller 220 and/or the device 107, or may be performed entirely independent of blocks 302-308 (which populate the facial recognition monitoring and feedback model) as a periodic post-processing function that runs every night, every week, or every month or after every n matches (where n may be 5, 10, 50, 100, or 1,000 or may be proportional to a number of enrollment images in the gallery of images, such as 5%, 10%, or 25%) to identify potential installation or operational shortcomings of the facial recognition system of process 300.

The controller 220 and/or the device 107 at block 310 may process the user and/or image characteristics and associated highest match confidence scores to identify absolute (e.g., less than a predefined minimum threshold level) or relative (e.g., a percentage below a mean or median level of existing data) highest match confidence scores for a single particular image or user characteristic or combination of particular image or user characteristics across multiple entries in the facial recognition monitoring and feedback model.

Figure 4:
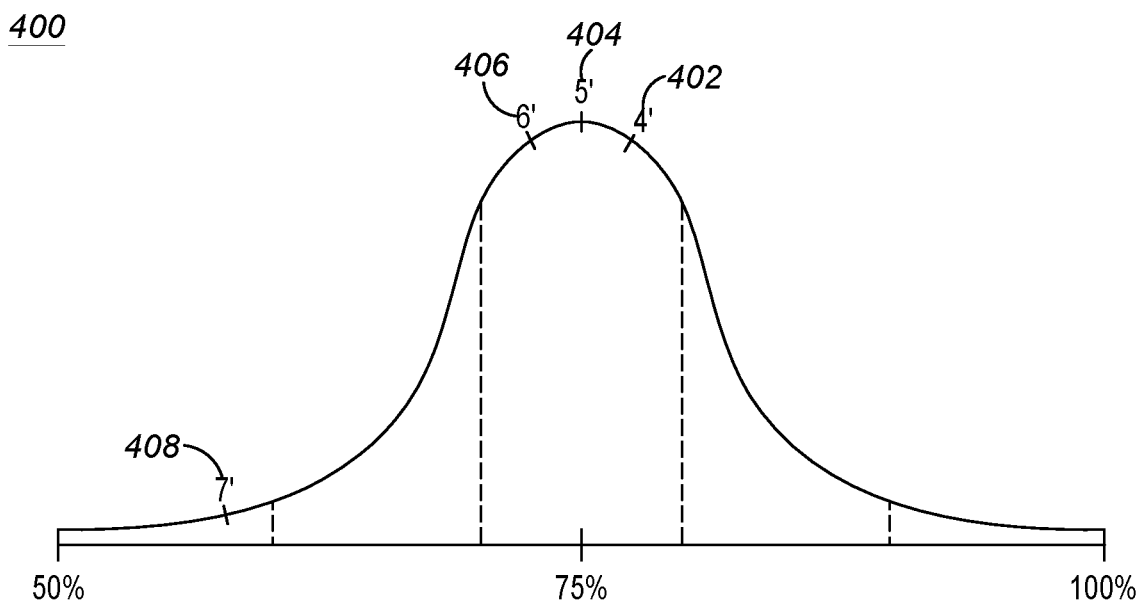
FIG. 4 illustrates a first distribution example for identifying image characteristics or user characteristics consistently associated with a threshold low highest match confidence score, in accordance with some embodiments.

Using the user characteristic of height from Table I above, reference is made to FIG. 4, which illustrates a normal (e.g., Gaussian or Bell) distribution 400 of highest match confidence scores for various first images stored in the facial recognition monitoring and feedback model relative to the user characteristic of height. Although a normal distribution is leveraged for ease of description, other distributions of underlying user and/or image characteristic data and highest match confidence scores is possible as well, including but not limited to a random distribution or a supergaussian (e.g., a laplacian) distribution, among other possibilities. Furthermore, the normal distribution illustrated in FIG. 4 may represent the underlying data directly, or may be an electronically calculated best fit normal distribution based on the underlying data, among other possibilities.

As shown in FIG. 4, various highest match confidence scores (e.g., as individual points, as averages for all respective heights or height ranges, as medians for all respective heights or height ranges, or based on some other statistical amalgamation for all heights or height ranges reflected in the database) are plotted across the normal distribution, including a 4' height highest match confidence score 402, a 5' height highest match confidence score 404, a 6' height highest match confidence score 406 (all occurring within the first standard deviation), and a 7' height highest match confidence score 408 occurring within the third standard deviation. A mean 410 highest match confidence score of 75% is illustrated for example purposes only, and in practice, may vary substantially from the example illustrated.

In this example, a mean or median of highest match confidence scores is identified for users having a height of 7' across a plurality of first images from camera capture devices (e.g., consistently associated with via a pattern of two or more instances) that is below a threshold low highest match confidence score (e.g., where an applied predefined absolute threshold is 60% highest match confidence score, or where an applied relative threshold is two standard deviations or more away from the mean).

In some embodiments, a higher number of occurrences may be required before a pattern (i.e., consistently associated) is identified at block 310. While in some examples a pattern of two occurrences may be sufficient, in other embodiments, a pattern of 3, 10, or 50 (or some percentage of total first image captures, such as 5, 10, 20, or 25%) or more may be required before subsequent steps of process 300 may be executed. Other examples are possible as well.

Figure 5:
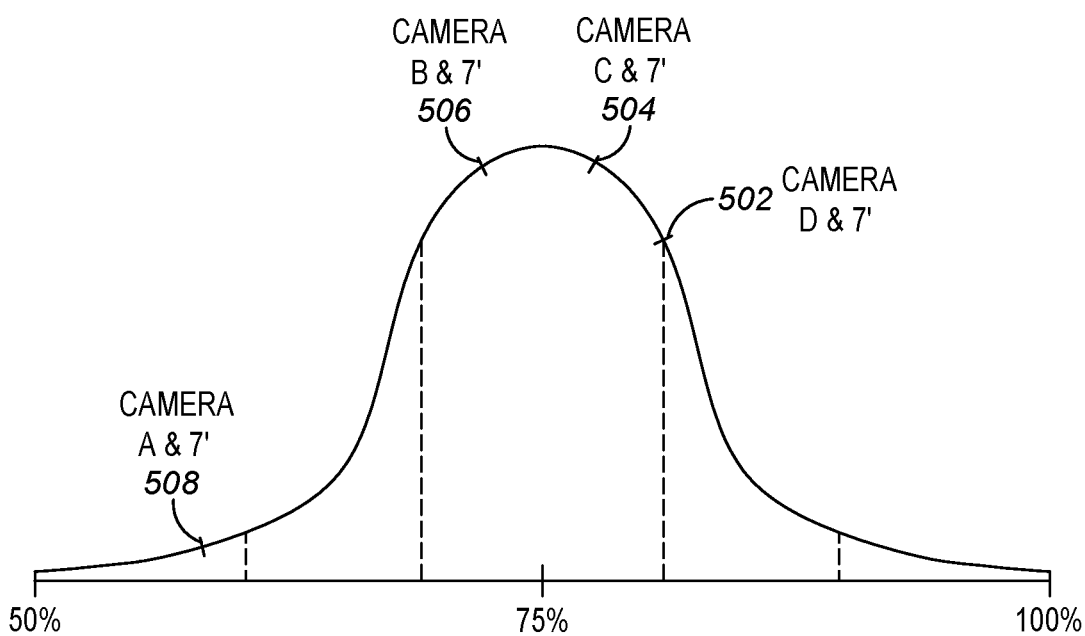
FIG. 5 illustrates a second combined distribution example for identifying image characteristics or user characteristics consistently associated with a threshold low highest match confidence score, in accordance with some embodiments.

Turning to FIG. 5, a second example is shown as a combination of two or more user or image characteristics being consistently associated with a below threshold low highest match confidence score. In this example, various highest match confidence scores (e.g., as individual points, as averages for all respective 7' user heights or height ranges at each camera location, as medians for all respective 7' heights or height ranges at each camera location, or based on some other statistical amalgamation for all 7' heights or height ranges at respective camera locations reflected in the database) are plotted across the normal distribution, including a 7' height highest match confidence score at a camera capture device identified as "Camera D" 502, a 7' height highest match confidence score at a different camera capture device identified as "Camera C" 504, a 7' height highest match confidence score at a different camera capture device identified as "Camera B" 506, and a 7' height highest match confidence score at a still different camera capture device identified as "Camera A" 508. A mean 510 highest match confidence score of 75% is illustrated for example purposes only, and in practice, may vary substantially from the example illustrated.

In this example, a mean or median of highest match confidence scores is identified for users having a height of 7' at a particular camera location (Camera A 508) (e.g., consistently associated with via a pattern of two or more instances) that is below a threshold low highest match confidence score (e.g., where an applied predefined absolute threshold is 60% highest match confidence score, or where an applied relative threshold is one or two (as in this case) or more standard deviations away from the mean, among other threshold setting possibilities).

At a block 312, and responsive to the controller 220 and/or the device 107 identifying the one or more stored image characteristics or user characteristics consistently (e.g., a pattern of two or more) associated with a below threshold low highest match confidence score, the controller 220 and/or the device 107 displays a notification at a display communicably coupled to the controller 220 and/or the device 107, the notification including an indication of an identified facial recognition low match pattern and identifying the one or more stored image characteristics or user characteristics.

For example, and again referencing the example set forth in FIG. 4, the notification displayed at step 312 may include a text notification that "An identified facial recognition low match pattern for users having a height or height range of 7' has been identified." As a result, a user receiving the displayed notification could take proactive actions to remedy the identified facial recognition low match pattern.

In some embodiments, the notification displayed at block 312 may include the location identification of the one or more camera capture devices that provided first images having the highest match confidence score(s) included in the pattern identified at step 310. For example, and now referencing the example set forth in FIG. 5, the notification displayed at step 312 may include a text notification that "An identified facial recognition low match pattern for users having a height or height range of 7' at Camera A has been identified." In some embodiments, a map illustrating a location of the Camera A at issue and/or uniquely identifying Camera A may be displayed accompanying the text notification. In addition, and in some examples, the underlying first images associated with the pattern of below threshold highest match confidence scores may be displayed (all at once, or in a scrollable or sequentially displayable manner) for further manual review and confirmation of the pattern identified at block 310. In some embodiments, a confirmation of the electronically detected pattern via detected user input may be required before proceeding with process 300.

In still other embodiments, a database mapping of user and/or image characteristics and workflow steps to correct the below threshold low highest match confidence score pattern may be accessed and workflow steps associated therewith displayed (all at once, or in a sequential manner) in the notification or via a separate display linked to and activatable via the notification. For example, and returning to the example of FIG. 5, the database mapping of user and/or image characteristics and workflow steps may be accessed and workflow steps instructing the Camera A to be repositioned vertically higher (or tilted higher if a PTZ camera) may be added to the notification or provided separately via the display to correct the electronically detected below threshold low highest match confidence score pattern. Similar adjustments could be suggested if the field of view (FOV) is detected to be too narrow or fixed angle of the camera is not directed towards a run-up to the camera, and is thus not providing the facial recognition system a sufficient opportunity for as close to a 0°, full frame facial capture as possible. Other image and/or user characteristics could be identified and provided with suggested workflow steps to correct as well.

Other user characteristics may be mapped to other workflow steps in the database mapping of user and/or image characteristics and workflow steps. For example, a pattern of below threshold low highest match confidence scores associated with a particular skin tone may be associated with a workflow step of adjusting lighting (e.g., adding additional lighting, removing extraneous lighting, pivoting lighting, replacing a broken bulb, replacing an incorrectly installed lumen-output bulb, etc.) to make sure all skin tones are properly picked up by the camera capture device (or devices) at issue. As another example, a pattern of below threshold low highest match confidence scores associated with a particular age (or age range) or gender may be associated with a workflow step of adjusting (perhaps particularly identified) image matching parameters of image matching algorithms used in the image matching process to improve and/or normalize image matching across ages and/or genders.

Other image and/or user characteristics may be mapped to other workflow steps in the database mapping of user and/or image characteristics and workflow steps. For example, a pattern of below threshold low highest match confidence scores associated with a particular user pose may be accompanied with a workflow step of adjusting a vertical or horizontal camera angle to make sure user poses captured in first images are optimized for the location of the camera capture device (or devices) at issue.

In still other embodiments, and for either or both of image or user characteristics, the recommended workflow may include a recommended adjusting of match thresholds for future image captures of images having the particular one of the image characteristics or user characteristics, and may provide an activatable link to directly modify the applied match threshold for the particular user or image characteristics at issue.

At a block 314, in addition to block 312 or in the alternative to step 312, the controller 220 and/or the device 107 transmits a notification same or similar to that displayed at block 312 to a supervisory computing system. The supervisory computing system may be a separate computing system from the controller 220 and/or the device 107, and may be one accessible by a monitoring user tasked with monitoring the performance of the facial recognition system. The notification transmitted at block 314 may include same or similar text, workflow steps, and/or match threshold modification options as set forth above. Similar to the description set forth in block 312, the notification transmitted at block 314 may include an activatable link to directly modify the applied match threshold for the particular user or image characteristics at issue, and responsive transmissions from the supervisory computing system indicative of activation of the activatable link may be processed and acted upon by the controller 220 and/or the device 107 in a same or similar way as that set forth above with respect to block 312.

After either one of blocks 312 and/or 314 are executed, and suggested or determined workflow steps performed to address the below threshold highest match confidence score associated with the particular stored image or user characteristic (either automatically detected by, e.g., detecting a change in height of the camera, a change in field of view, a change in lighting, etc., or manually detected by the controller 220 and/or the device 107 receiving user input indicating that workflow steps to correct the below threshold highest match confidence score have been completed), the facial recognition monitoring and feedback system may continue to track that same particular stored image or user characteristic. If, despite the performance of the workflow steps intended to address the below threshold highest match confidence score, the same outlier or bias evidenced by the below threshold highest match confidence score for the same particular stored image or user characteristic, the facial recognition monitoring and feedback system executing at the controller 220 and/or the device 107 may cause a further notification of potential algorithmic bias or algorithmic malfunction (e.g., in the image matching algorithm) to be displayed in a same or similar way as set forth above with respect to block 312 or may be caused to be transmitted in a same or similar way as set forth above with respect to block 314. The further notification may identify certain known algorithms that have resulted in such bias or malfunction in the past, and/or may identify, via a mapping, one or more algorithmic parameters that may be adjusted (via weighting, etc.) in order to correct or compensate for such known biases or malfunctions based on past results and experiences with particularly identified image matching algorithms.

Attention is next directed to FIG. 6, which depicts a flowchart representative of a method 600 for image enrollment into the image gallery set forth above consistent with this disclosure. The operations of the method 600 of FIG. 6 correspond to machine readable instructions that are executed by the device 107, and specifically the controller 220 of the device 107 (which may be the same device executing process 300 and 600 while, in other embodiments, may be an entirely different device solely executing method 600 independent of process 300). In the illustrated example, the instructions represented by the blocks of FIG. 6 are stored at the memory 222 for example, as the application(s) 223. The method 600 of FIG. 6 is one way in which the controller 220 and/or the device 107 and/or the system 100 may be configured. Furthermore, the following discussion of the method 600 of FIG. 6 will lead to a further understanding of the system 100, and its various components with respect to method 600.

The method 600 of FIG. 6 need not be performed in the exact sequence as shown and likewise various blocks may be performed in parallel rather than in sequence. Accordingly, the elements of method 600 are referred to herein as "blocks" rather than "steps." The method 600 of FIG. 6 may be implemented on variations of the system 100 of FIG. 1, as well, as discussed alternatively herein.

At a block 602, the controller 220 and/or the device 107 receives an enrollment image from one of an enrollment computing device for enrollment into the stored enrollment images in the gallery of images for future use in image matching. In some embodiments, the enrollment computing device may be the same as the controller 220 and/or the device 107, while in other embodiments, the enrollment computing device may be a computing device remote from the controller 220 and/or the device 107 but communicably coupled to the controller 220 and/or the device 107.

At a block 604, the controller 220 and/or the device 107 calculates an enrollment image quality score as a function of one or more of user pose, image resolution, image lighting quality, facial occlusion, and facial resolution via a video processing algorithm. Existing algorithms for determining a facial pose of a user in the enrollment image, a resolution of the enrollment image, a lighting level of the enrollment image, a facial occlusion level (e.g., portion of face occluded by a hat, hood, eyeglasses, etc.), and a facial resolution of the enrollment image, may be leveraged to assign scores to each of the one or more parameters leveraged against the enrollment image to arrive at a final enrollment image quality score. For example, a range of 50 points each may be assigned to each of the five parameters of pose, lighting, resolution, facial occlusion, and facial resolution to arrive at an enrollment score calculated out of 250. Of course, other scales and thresholds, and more or less parameters, could be used as well or instead. In other embodiments, a trained machine learning model may be leveraged to provide a predicted enrollment quality image score based on a training set of images and resultant match scores from an applied matching algorithm. Other examples are possible as well.

At a block 606, the controller 220 and/or the device 107 compares the calculated enrollment image quality score from block 604 to a threshold enrollment image quality score and, when the calculated enrollment image quality score is above the threshold enrollment image quality score, the image may be enrolled and processing proceeds back to block 602.

However, when the calculated enrollment image quality score is below the threshold enrollment image quality score at block 606, processing proceeds to block 608, where the controller 220 and/or the device 107 one of displays a second notification at a display communicably coupled to the enrollment computing device and transmits the second notification to a supervisory enrollment computing system (e.g., a separate computing system associated with a manager or monitor of the enrollment system), including an indication of the calculated enrollment image quality score being below the threshold enrollment image quality score.

For example, where the threshold enrollment image quality score is an absolute or predefined value, such as 210/250, and a calculated enrollment image quality score for the enrollment image received at block 602 is less than 210 (e.g., 190), a notification may be caused to be displayed or transmitted in the manner set forth in block 608. In other embodiments, where the threshold image quality score is a relative value, such as one or two, or more, standard deviations away (or some other relative measurement) from the mean or median of existing enrollment images in a similar manner to that set forth above with respect to FIGS. 3-5, the notification may similarly be caused to be displayed or transmitted in the manner set forth in block 608.

Included in the notification may be an identity of the image characteristic(s) (e.g., selected from one or more of user pose, image resolution, image lighting quality, facial occlusion, and facial resolution) that were identified as deficient at block 604, thereby providing the enrollee an opportunity to correct the deficiencies.

Accompanying the notification at block 608 may be a request for input on whether to proceed with enrollment into the gallery of images of the enrollment image received at block 602 despite the notification displayed or transmitted at block 608. If input is received (either locally at the controller 220 and/or the device 107 when the notification is displayed locally at block 608, or received from the supervisory computing system in response when the notification is transmitted at block 608) requesting that the enrollment image not be enrolled into the gallery of images, processing may proceed back to block 602 where an improved enrollment image may be procured.

If, alternatively, input is received (either locally at the controller 220 and/or the device 107 when the notification is displayed locally at block 608, or received in response when the notification is transmitted at block 608) requesting that the enrollment image be enrolled into the gallery of images despite the deficiencies identified at block 608, processing may proceed to block 612.

At block 612, the controller 220 and/or the device 107 records the input received at the enrollment computing device to proceed with the enrollment of the enrollment image into the stored gallery of images along with an identity of one of a second user at the enrollment computing device or the supervisory computing device, the enrollment computing device, or the supervisory computing device, into an electronically stored enrollment record database. For example, the identity of the second user may be determined and stored as a function of an authentication credential used by the second user to login to the respective one of the enrollment computing device or the supervisory computing device.

Additionally or alternatively, the identity of the enrollment computing device may be determined and stored as a function of an IP address, MAC address, or some other network identifier or hardware identifier that uniquely identifies the enrollment computing device, as with the supervisory computing device.

At a block 614, the controller 220 and/or the device 107 detects (via the enrollment record database) a pattern (e.g., two or more instances) of enrollment of enrollment images having calculated enrollment image quality scores below the threshold enrollment image quality score from the one of the second user, the second enrollment computing device, and the supervisory computing device. The pattern identification in block 612 may be performed after every time another enrollment image is received at the controller 220 and/or the device 107, and/or may be performed entirely independent of blocks 602-612 (which populate the enrollment record database) as a periodic post-processing function that runs every night, every week, or every month to identify potential image enrollment shortcomings of the image enrollment system of process 600.

Responsive to detecting the pattern at block 614, at block 616, the controller 220 and/or the device 107 transmit a second notification to one of the enrollment computing device and the supervisory enrollment computing device (perhaps associated with a supervisor of the system and/or operator of the enrollment computing device) including an indication of an identified low enrollment image quality pattern. The indication in the second notification may further identify one of the second user, the second enrollment computing device, and the supervisory computing device. A responsive option may be provided in the second notification to prevent further enrollment of images from one of the second user, the second enrollment computing device, and the supervisory computing device, and responsive to receiving an instruction to do so, the controller 220 and/or the device 107 may prevent further enrollment of enrollment images from one of the second user, the second enrollment computing device, and the supervisory computing device, as one example.

In other embodiments, and while process 600 of FIG. 6 focuses on a measured image quality of an enrollment image, the same or similar process could be applied to user-submitted search images (e.g., images provided to the system for matching against the existing gallery of images, perhaps to identify a person of interest) in order to identify a user or computing system having a pattern (e.g., two or more times) of submitting search images of low quality, which may lead to a large number of false positive matches, and should be avoided.

The process 600 may thus be adapted to receive a user-submitted search image (instead of an enrollment image) from a second computing device, calculate a user-submitted search image quality score, compare the calculated user-submitted search image quality score to a threshold user-submitted search image quality score, and when the calculated user-submitted search image quality score is below the threshold user-submitted search image quality score, notify one of the second computing device or a separate supervisory computing device, receive an input indication to proceed with the user-submitted search despite the user-submitted search image having a below-threshold user-submitted search image quality score, record the input indication to proceed with the matching search of the stored gallery of images along with an identity of one of the second user, the second computing device, and the supervisory computing device, and responsive to detecting a pattern of user-submitted search images having calculated user-submitted search image quality scores below the threshold user-submitted search image quality score from one of the second user, the second computing device, and the supervisory computing device (average or median across a plurality of prior-user-submitted search images for that particular user or computing device associated with a plurality of prior-user-submitted search images), transmitting a second notification to the one of the second computing device and the supervisory computing device including an indication of an identified low user-submitted search image quality pattern. In some embodiments, the controller 220 and/or the device 107 may prevent further submission of user-submitted search images from one of the second user, the second enrollment computing device, and the supervisory computing device, as one example.

As should be apparent from this detailed description above, the operations and functions of the controller 220 and/or the device 107 are sufficiently complex as to require their implementation on a computer system, and cannot be performed, as a practical matter, in the human mind. Electronic computing devices such as controller 220 and/or the device 107 and others set forth herein are understood as requiring and providing speed and accuracy and complexity management that are not obtainable by human mental steps, in addition to the inherently digital nature of such operations (e.g., a human mind cannot interface directly with RAM or other digital storage, cannot transmit or receive electronic messages, electronically encoded images or video, electronically encoded audio, etc., and cannot electronically store representations of relevant facial recognition performance characteristics across cameras, locations, and/or users, continuously or periodically evaluate the electronically stored performance characteristics, and proactively detect errors or oversights in selection of types of cameras, environments, and/or installations that may have resulted in facial recognition systems that are unintentionally biased against certain demographics and/or that may result in varying quality of image captures across different installation locations, and responsively access workflow mappings that may be leveraged to provide notifications and/or associated workflow solutions to correct the errors or oversights, among other features and functions set forth herein).

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "one of", without a more limiting modifier such as "only one of", and when applied herein to two or more subsequently defined options such as "one of A and B" should be construed to mean an existence of any one of the options in the list alone (e.g., A alone or B alone) or any combination of two or more of the options in the list (e.g., A and B together).

A device or structure that is "configured" in a certain way is configured in at least that way, but may also be configured in ways that are not listed. The terms "coupled", "coupling" or "connected" as used herein can have several different meanings depending on the context in which these terms are used. For example, the terms coupled, coupling, or connected can have a mechanical or electrical connotation. For example, as used herein, the terms coupled, coupling, or connected can indicate that two elements or devices are directly connected to one another or connected to one another through intermediate elements or devices via an electrical element, electrical signal or a mechanical element depending on the particular context.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Any suitable computer-usable or computer readable medium may be utilized. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. In the context of this document, a computer-usable or computer-readable medium may be any medium that can contain, store, communicate, propagate, or transport the program for use by or in connection with the instruction execution system, apparatus, or device.

Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation. For example, computer program code for carrying out operations of various example embodiments may be written in an object oriented programming language such as Java, Smalltalk, C++, Python, or the like. However, the computer program code for carrying out operations of various example embodiments may also be written in conventional procedural programming languages, such as the "C" programming language or similar programming languages. The program code may execute entirely on a computer, partly on the computer, as a stand-alone software package, partly on the computer and partly on a remote computer or server or entirely on the remote computer or server. In the latter scenario, the remote computer or server may be connected to the computer through a local area network (LAN) or a wide area network (WAN), or the connection may be made to an external computer (for example, through the Internet using an Internet Service Provider).

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method for performance monitoring and feedback for facial recognition systems comprising:
    receiving, at a facial recognition computing device, a first image for image matching from a camera capture device at a first location for purposes of image matching to a gallery of images;
    determining, by the facial recognition computing device, a highest match confidence score of the first image to a particular one of a plurality of stored enrollment images in the gallery of images;
    determining, by the facial recognition computing device, one or more image characteristics or user characteristics associated with the respective first image or first user in the first image;
    adding, by the facial recognition computing device, the one or more image characteristics or user characteristics and associated highest match confidence score to an electronically stored facial recognition monitoring and feedback model;
    identifying, by the facial recognition computing device, and based on a plurality of stored image characteristics or user characteristics and associated highest match confidences in the facial recognition monitoring and feedback model, a particular one of the one or more stored image characteristics or user characteristics consistently associated with a below threshold highest match confidence score; and
    one of displaying a notification, by the facial recognition computing device at a display device communicably coupled to the facial recognition computing device and transmitting, by the facial recognition computing device, the notification to a supervisory computing system, the notification including an indication of an identified facial recognition low match pattern and identifying the particular one of the one or more stored image characteristics or user characteristics.

2. The method of claim 1, wherein the camera capture device at the first location is associated with one of a biometric access system controlling access to a secured area and a person of interest matching system for matching captured images to stored persons of interest, wherein the one or more image characteristics or user characteristics include a unique identifier identifying a camera or camera location at which the first image was taken, the facial recognition computing device receiving a plurality of images captured across a plurality of cameras associated with geographically dispersed locations.

3. The method of claim 2, wherein the particular one of the one or more stored image characteristics or user characteristics consistently associated with the below threshold highest match confidence score includes a particular one of the uniquely identified cameras or camera locations.

4. The method of claim 3, wherein the transmitted notification includes an identity of the particular one of the uniquely identified cameras or camera locations.

5. The method of claim 2, wherein the one or more image characteristics or user characteristics include user demographic information including one or more user demographic parameters associated with a particular demographic of user included in the first image and identified via video processing, and wherein the particular one of the one or more stored image characteristics or user characteristics consistently associated with the below threshold highest match confidence score includes a particular one of the user demographic parameters at a uniquely identified cameras or camera location, and wherein the transmitted notification includes an identity of the particular one of the uniquely identified cameras or camera locations and the particular demographic parameter.

6. The method of claim 1, wherein the one or more image characteristics or user characteristics include user demographic information including one or more user demographic parameters associated with a particular demographic of user included in the image, and wherein the particular one of the one or more stored image characteristics or user characteristics consistently associated with the below threshold highest match confidence score includes a particular one of the user demographic parameters.

7. The method of claim 6, wherein the user demographic parameters include one or more selected from age, gender, height, and skin tone.

8. The method of claim 1, wherein the one or more image characteristics or user characteristics include image quality parameters including one or more of user pose in the first image, face resolution in the captured image, facial occlusion in the captured image, and lighting quality in the captured image and identified via video processing, and wherein the particular one of the one or more stored image characteristics or user characteristics consistently associated with the below threshold highest match confidence score includes a particular one of the image quality parameters.

9. The method of claim 8, wherein the transmitted notification includes an identity of the particular one of the image quality parameters.

10. The method of claim 1, wherein the transmitted notification includes, as a function of the particular one of the one or more stored image characteristics or user characteristics, a recommended workflow to compensate for the identified facial recognition low match pattern.

11. The method of claim 10, wherein the recommended workflow includes one of a suggested modification to environmental effects surrounding the camera capture device, moving the camera capture device to a different fixed location, adjusting camera capture parameters of the camera capture device, and adjusting match thresholds for future image captures of images having the particular one of the one or more stored image characteristics or user characteristics.

12. The method of claim 10, further comprising, subsequent to receiving an indication that the recommended workflow to compensate for the identified facial recognition low match pattern has been completed, continuing to monitor, by the facial recognition computing device, the particular one of the one or more stored image characteristics or user characteristics and determining that the particular one of the one or more stored image characteristics or user characteristics continues to be consistently associated with a below threshold highest match confidence score, and responsively one of displaying a further notification, by the facial recognition computing device at a display device communicably coupled to the facial recognition computing device and transmitting, by the facial recognition computing device, the further notification to a supervisory computing system, the further notification including an indication of a potential algorithmic bias of malfunction in an image matching algorithm being used to match received images to enrollment images in the gallery of images.

13. The method of claim 1, further comprising:
  receiving, at the facial recognition computing device, an enrollment image from an enrollment computing device for enrollment into the gallery of enrollment images;
  calculating, by the facial recognition computing device, an enrollment image quality score as a function of one or more of user pose, image resolution, image lighting quality, facial occlusion, and facial resolution via a video processing algorithm;
  comparing the calculated enrollment image quality score to a threshold enrollment image quality score and, when the calculated enrollment image quality score is below the threshold enrollment image quality score, one of displaying a second notification, by the facial recognition computing device at the display communicably coupled to the facial recognition computing device and transmitting, by the facial recognition computing device, the second notification to a supervisory computing system, the second notification including an indication of the calculated image quality score being below the threshold enrollment image quality score and receiving input from the enrollment computing device to proceed with the enrollment of the enrollment image into the stored gallery of images;
  recording the input from the enrollment computing device to proceed with the enrollment of the enrollment image into the stored gallery of images along with an identity of one of the enrollment computing device and a second user associated with the enrollment computing device; and
  responsive to detecting a pattern of enrollment of enrollment images having calculated enrollment image quality scores below the threshold enrollment image quality score from the one of the second user and the enrollment computing device:
    transmitting, by the facial recognition computing device, a second notification to the one of the enrollment computing device and a supervisory enrollment computing device including an indication of an identified low enrollment image quality pattern.

14. The method of claim 13, wherein the notification further identifies the one or more of the user pose, image resolution, image lighting quality, facial occlusion, and facial resolution leading to the identified low enrollment image quality pattern and further includes an identity of one of the second user and the enrollment computing device.

15. The method of claim 14, wherein the notification further identifies recommendations of methods and image capture device parameters to modify in order to improve the one or more of the user pose, image resolution, image lighting quality, facial occlusion, and facial resolution of enrolled images leading to the identified low enrollment image quality pattern.

16. The method of claim 1, wherein the camera capture device at the first location is associated with a biometric access system controlling access to a secured area, and wherein access is granted to the secured area via the biometric access system when the first image matches the particular one of the plurality of stored enrollment images with a minimum threshold match confidence.

17. The method of claim 1, wherein the one or more image characteristics or user characteristics include user identity information associated with a particular identity of a user included in the image and identified via video processing, and wherein the particular one of the one or more stored image characteristics or user characteristics consistently associated with the below threshold highest match confidence score includes a particular user identified in the first image.

18. The method of claim 1, further comprising:
  receiving, at the facial recognition computing device, a user-submitted search image from a second computing device for matching against the stored enrollment images;
  calculating, by the facial recognition computing device, a user-submitted search image quality score as a function of one or more of user pose, image resolution, image lighting quality, facial occlusion, and facial resolution via a video processing algorithm;
  comparing the calculated user-submitted search image quality score to a threshold user-submitted search image quality score and, when the calculated user-submitted search image quality score is below the threshold user-submitted search image quality score, one of displaying a second notification, by the facial recognition computing device at the display communicably coupled to the facial recognition computing device and transmitting, by the facial recognition computing device, the second notification to a supervisory computing system, the second notification including an indication of the calculated user-submitted search image quality score being below the threshold user-submitted search image quality score and receiving input at the second computing device to proceed with the matching search of the stored gallery of images with the user-submitted search image;
  recording the input from the one of the second computing device and supervisory computing device to proceed with the matching search of the stored gallery of images along with an identity of one of the second computing device, the supervisory computing device, and a second user associated with one of the second computing device and the supervisory computing device; and
  responsive to detecting a pattern of user-submitted search images having calculated user-submitted search image quality scores below the threshold user-submitted search image quality score from the one of the second user, the second computing device, and the supervisory computing device:

transmitting, by the facial recognition computing device, a second notification to the one of the second computing device and the supervisory computing device including an indication of an identified low user-submitted search image quality pattern.

19. The method of claim 18, wherein the notification further:
identifies the one or more of the user pose, image resolution, image lighting quality, facial occlusion, and facial resolution via a video processing algorithm of user-submitted search images leading to the identified low user-submitted search image quality pattern; and
includes recommendations of methods and image capture device parameters to modify in order to improve the one or more of the user pose, image resolution, image lighting quality, facial occlusion, and facial resolution of user-submitted search images leading to the identified low user-submitted search image quality pattern.

20. A facial recognition performance monitoring and feedback computing device comprising:
a controller in communication with a camera capture device, the controller configured to:
receive a first image for image matching from a camera capture device at a first location for purposes of image matching to a gallery of images, the camera capture device communicatively coupled to the controller;
determine a highest match confidence score of the first image to a particular one of a plurality of stored enrollment images in the gallery of images;
determine one or more image characteristics or user characteristics associated with the respective first image or first user in the first image;
add the one or more image characteristics or user characteristics and associated highest match confidence score to an electronically stored facial recognition monitoring and feedback model;
identify, based on a plurality of stored image characteristics or user characteristics and associated highest match confidences in the facial recognition monitoring and feedback model, a particular one of the one or more stored image characteristics or user characteristics consistently associated with a below threshold highest match confidence score; and
one of display a notification, at a display device communicably coupled to the facial recognition performance monitoring and feedback computing device and transmit, via a transceiver, the notification to a supervisory computing system, the notification including an indication of an identified facial recognition low match pattern and identifying the particular one of the one or more stored image characteristics or user characteristics.

* * * * *